United States Patent [19]

Mochizuki et al.

[11] Patent Number: 4,882,483
[45] Date of Patent: Nov. 21, 1989

[54] OPTICAL SCANNING APPARATUS WITH OPTICAL CORRECTION FOR SCAN MIRROR SURFACE TILT

[75] Inventors: Takeshi Mochizuki, Mito; Akira Arimoto, Kodaira; Susumu Saito, Hachioji, all of Japan

[73] Assignees: Hitachi, Ltd.; Hitachi Koki Co., Ltd., both of Tokyo, Japan

[21] Appl. No.: 179,407

[22] Filed: Apr. 8, 1988

[30] Foreign Application Priority Data

Apr. 10, 1987 [JP] Japan .................................. 62-86886

[51] Int. Cl.$^4$ ............................................... H01J 3/14
[52] U.S. Cl. ...................................... 250/236; 350/6.8
[58] Field of Search ............... 250/234, 235, 236, 216; 350/6.7, 6.8; 358/293, 294

[56] References Cited

U.S. PATENT DOCUMENTS 4,756,583 7/1988 Morimoto .......................... 350/6.8
4,756,584 7/1988 Takanashi .......................... 350/6.8

Primary Examiner—David C. Nelms
Attorney, Agent, or Firm—Antonelli, Terry & Wands

[57] ABSTRACT

In an optical scanning apparatus, a scanning lens is composed of three lens elements. The centrally located lens element of the scanning lens has a refractive power in the direction for correcting the surface tilt, that is, an inverted number of a focal length that is changed in accordance with the scanning view angle, whereby curvature of field is well corrected and RMS spot diameters on the scanning surface may be small. In addition, even if the view angle is increased, imaging characteristics may be kept at a high resolving power.

4 Claims, 5 Drawing Sheets

OPTICAL SCANNING APPARATUS WITH OPTICAL CORRECTION FOR SCAN MIRROR SURFACE TILT

BACKGROUND OF THE INVENTION

1. FIELD OF THE INVENTION

The present invention relates to an optical scanning apparatus, and more particularly to an optical scanning apparatus suitable for a laser printer that is used as an apparatus for printing out information.

2. DESCRIPTION OF THE PRIOR ART

In laser printers, the laser beam has been deflected to scan a light sensitive drum by the combination of an F$\theta$ lens and a rotary polygonal mirror. One of problems that would be encountered in scanning the laser beam is that there would be generated a non-uniformity in scanning pitch due to a tilt of reflective surfaces of the rotary polygonal mirror. In order to obviate this problem, there have been proposed various methods for reducing adverse affects due to the tilt error of the rotary polygonal mirror by means of the combination of a cylindrical lens and a toric F$\theta$ lens (Japanese Patent Unexamined Publication No. 48-98844), the combination of a prism and an F$\theta$ lens (Japanese Patent Examined Publication No. 59-9883), the combination of a toric lens and an F$\theta$ lens (Japanese Patent Unexamined Publication No. 48-49315), the combination of a cylindrical lens having at least one of a modified cylindrical surface and an spherical surface where a radius of curvature is varied in surface tilt direction in accordance with a height from an optical axis and an F$\theta$ lens (Japanese Patent Unexamined Publication Nos. 61-120112 and 61-175607) and the like. However, these methods suffer from difficulties in which the increased number of components must be used due to the use of two kinds of optical elements such as an asymmetrical optical element and a F$\theta$ lens as described above. In order to overcome these difficulties, it has been also proposed to impart the surface tilt correction function to the F$\theta$ lens. According to this proposal, there is provided a cylindrical surface (Japanese Patent Unexamined Publication No. 54-126051) or a toric surface (Japanese Patent Unexamined Publication No. 57-144515) as well as ordinary spherical surfaces or planar surfaces. Assuming that a first plane be perpendicular to a second plane, both the planes being intersected with the lens surface, the "toric surface" means a surface having different radii of curvature of the first and second intersection lines. Namely, the toric surface is expressed by the following secondary expansion:

$$z = Ax^2 + By^2 \ldots \quad (1)$$

where z corresponds to the optical axis, xz and yz correspond to the surfaces that are perpendicular to each other and include the optical axis, and A and B are coefficients and are independent of the view angle $\theta$ relative to the optical axis ($A \neq B$). In the above-described proposal, the focal length (fy) within a surface yz that affects the surface tilt is shorter than the focal length (fx) within the optical scanning surface xz. Thus it is difficult to keep the imaging characteristics in the surface tilt direction in a good condition over the whole scanning region.

SUMMARY OF THE INVENTION

An object of the present invention is to provide an optical scanning apparatus in which a curvature of a central lens element in the scanning lens is changed in correspondence with the deflection direction to obtain necessary imaging characteristics.

In order to attain this and other objects, the present invention is characterized in that a configuration of a lens surface of a central lens element of three lens elements forming a scanning lens meeting the following condition:

$$z = Ax^2 + B'(\theta) \cdot y^2 \quad (2)$$
$$(B' \geq B)$$

wherein a coefficient B' is a function of a view angle $\theta$, and the radius of curvature of the scanning lens in the surface tilt direction is changed in correspondence with the deflection direction. According to the present invention, fy is a function of $\theta$, the change of $\theta$ means a change of fy, that is, the change of the refractive power that is an inverted number of the focal length.

Also, in the central lens element of the above-described scanning lens, the refractive power is monotonously changed as the absolute value of the scanning view angle is increased. It is possible to move the imaging point onto the drum surface even at the position except for the optical axis ($\theta \neq 0$).

Also, in order to possibly decrease the outer diameter of the lens element, it is preferable to adapt an arrangement in which the central lens element is close to the rotary polygonal mirror side lens element than the lens element on the scanning plane side relative to the scanning surface, meeting the following relationship:

$$1.0 > d_I/d_{II} > 0 \ldots \quad (3)$$

where $d_I$ is the distance between the principal points of the lens element located in the central position and the lens element located in the central position and the lens element closest to the rotary polygonal mirror, $d_{II}$ is the distance between the principal points of the lens element located farthest from the rotary polygonal mirror and the lens located in the central position.

As described above, according to the present invention, in the optical scanning apparatus, the refractive power, in the surface tilt direction, of the surface having the tilt correction function of the lens element located in the central position of the scanning lens is changed in accordance with the scanning view angle, so that the field curvature is corrected and the RMS spot diameter may be reduced. Therefore, even if the view angle would be enlarged, it would be possible to keep the imaging characteristics at the high resolving power level. When the scanning width is scanned, if the large view angle is scanned, it is possible to shorten the focal length. Therefore, it is possible to make the optical system compact. Also, since the surface having the curvature radius changed is applied to the central lens element that has the not so large outer diameter, the cost in manufacture in the press molding may be reduced and the precision in asphericity may be enhanced.

DESCRIPTION OF THE PREFERRED EMBODIMENTS

In order to improve the prior art, it has been proposed to vary the focal length in the surface tilt direction of the surface, farthest from the rotary polygonal mirror, of the Fθ lens in accordance with the deflection direction in the xz surface (Japanese Patent Application No. 61-108440).

In order to vary the focal length in correspondence with the deflection direction, there are two methods to change the refractive index or the curvature. The former method to change the refractive index is described as an example of a refractive index gradient type lens (see Applied Optics, 23[11]1735, in 1984). However, there has been no actual product of such a lens applied to the scanning lens. This is not general. It is preferable to adapt the latter method. However, it would be difficult to manufacture a lens having a shape where the curvature is changed in accordance with the deflection direction, by polishing or grinding. This would be difficult in light of technology and the production efficiency. Thus, it is preferable to adapt the press molding technology. However, in case of press molding, the manufacture of dies needs high cost as the diameter of the lens is increased, and this is disadvantageous in enhancing the aspherical precision over the whole lens surface.

In the case where the scanning lens is composed of three lens elements in combination, it is possible to most decrease the outer diameter of the lens element located close to the rotary polygonal mirror. This is advantageous for the press molding technology. However, the surface having the different curvature in the correspondence with the deflection direction must meet the severe conditions as it is located close to the rotary polygonal mirror.

Figure 9:
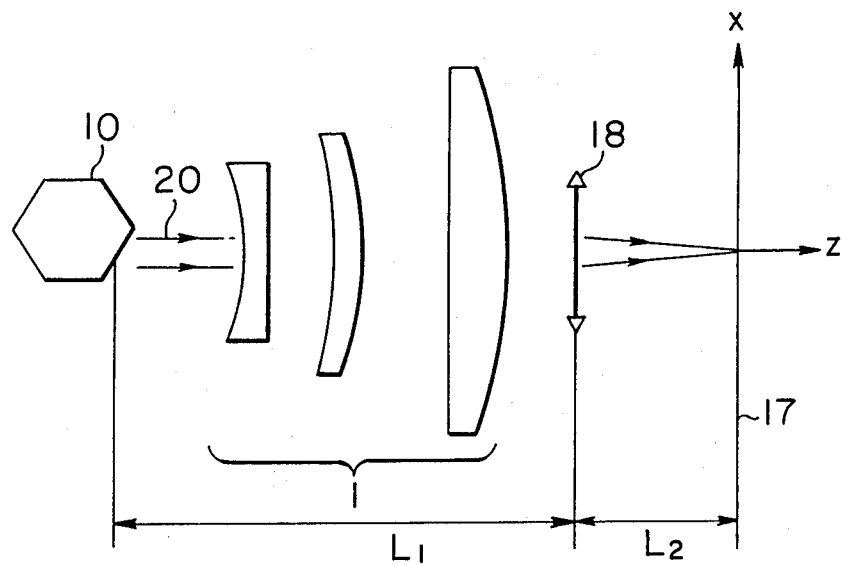
FIGS. 9 and 10 are illustrations of xz and yz surfaces for explaining the focal lengths in the scanning direction and the surface tilt direction.
Figure 10:
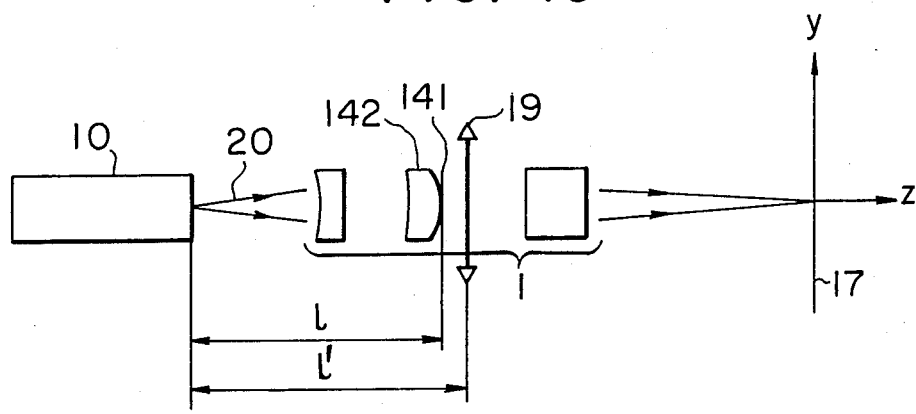

Referring now to FIGS. 9 and 10, explanation will be made as to a relationship between a distance from a rotary polygonal mirror to a surface of a scanning lens where the curvature is changed in correspondence with the deflection direction and a focal length of the scanning lens in the surface tilt direction. FIG. 9 shows an optical arrangement with respect to the xz surface that is the scanning plane including the optical axis z of the scanning lens, and shows the condition in which a flux of light 20 from the rotary polygonal mirror 10 reaches the scanning surface 17 through the scanning lens 1. Since the scanning lens 1 is composed of a plurality (three in this case) of lens elements, a principal plane of the scanning direction as the optical scanning lens 1 is located at a position indicated by reference numeral 18. FIG. 10 shows a relationship with respect to the surface yz that is the plane surface affecting the surface tilt at the view angle $\theta$ when the axis z represents the optical axis of the optical scanning apparatus, and shows the condition where the flux of light 20 from the rotary polygonal mirror 10 reaches the scanning plane 17 through the optical scanning lens 1. The principal plane of the optical scanning lens 1 in the plane tilt direction is located at a position indicated by reference numeral 19. $L_1$ and $L_2$ are the distances from the principal point of the scanning direction in the principal plane 18 of the scanning lens 1 to the deflection point and the scanning surface 17. If the scanning direction of the incident light flux 20 to the scanning lens 1 is parallel, the distance $L_2$ is identical with the focal length fx in the scanning direction.

$$L_2 = fx \ldots \quad (4)$$

Assume that, in order to establish a conjugate relationship between the deflection point of the rotary polygonal mirror and the scanning plane at a view angle of $\theta$ so that the light beam at the deflection point is focused on the scanning plane, in FIG. 10, the curvature in the surface tilt direction of a plane of a central lens element, located by a distance l from the deflection point, of the scanning lens 1 is larger than the curvature 141 in the scanning deflection, and the refractive power of that surface is increased by 1/fa to form the surface 142 indicated by the solid line. In this case, the focal length, in the surface tilt direction, of the central lens lement of the scanning lens is expressed by fy (fy<fx). At this time, if the distance from the deflection point to the principal surface 19 in the surface tilt direction of the scanning lens is represented by l', the following relationships are established irrespective of the distance between the principal points on the object and image sides.

$$\frac{1}{fy} = \frac{1}{fa} + \frac{1}{fx} - (L_1 - l)\frac{1}{fa}\cdot\frac{1}{fx} \quad (5)$$

$$\frac{1}{fy} = \frac{1}{l'} + \frac{1}{L_2 + L_1 - l'} \quad (6)$$

Figure 3:
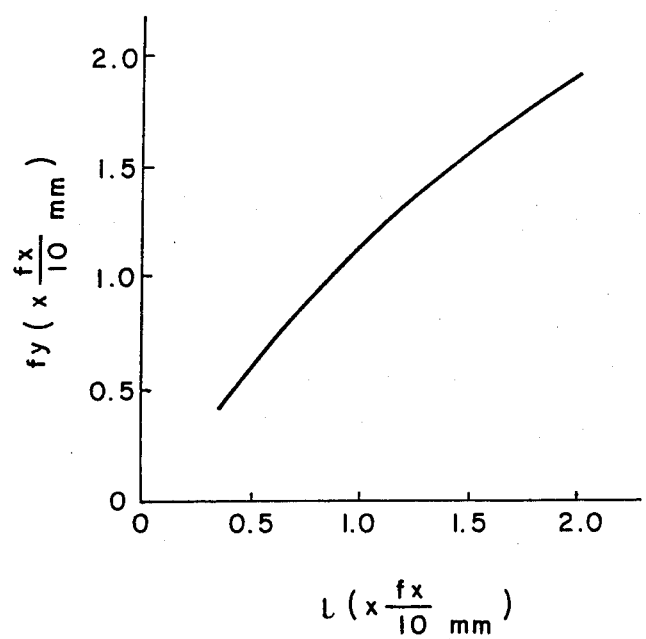
FIG. 3 is a graph showing changes of the focal length in the surface tilt direction.

From the equations (4) to (6), in the case of $2/L_1 = 2.67$, the relationship between l and fy is shown in FIG. 3. From this, it will be understood that the smaller the distance l from the deflection point to the surface where the curvature is changed in accordance with the deflection direction, the smaller the focal length of the scanning lens in the surface tilt direction will become. Therefore, if the curvature of field in the scanning direction is corrected, the shorter the focal length, the more the curvature in the surface tilt direction concomitant with the increase in the view angle of the image will become. Therefore, the curvature of field to be corrected by changing the curvature in accordance with the deflection direction will be large.

The effect to correct the curvature of field by changing the curvature in accordance with the deflection direction will be described later.

Subsequently, the difference in the curvature of field to be corrected between adjacent light fluxes on the surface for changing the curvature in correspondence with the deflection direction will be explained. In FIG.

4, reference numeral 10 denotes a rotary polygonal mirror, numeral 17 denotes a scanning plane, numeral 12 denotes a surface, on the scanning plane, of a lens element, closest to the rotary polygonal mirror, of the lens elements constituting the scanning lens, reference numeral 14 denotes a surface, on the scanning side, of the lens element adjacent to the surface 12, reference characters $l_1$ and $l_2$ represent the distances from the deflection point to the surfaces 12 to 14, respectively, reference characters $\delta_1$ and $\delta_2$ represent diameters of the light flux on the surfaces 12 and 14 in the scanning direction, respectively, characters $E_1$ and $E_2$ represent the scanning regions of the light flux, $\theta 1$ and $\theta 2$ represent the differences between the adjacent light fluxes, respectively and Ⓗ represents the overall view angle. Also, in the case where the surfaces in which the curvatures are changed in accordance with the deflection direction are the surfaces 12 and 14, the image surfaces in the surface tilt direction are expressed by the distances $S_1(\theta)$ and $S_2(\theta)$ from the scanning surface. In this case, since the scanning direction of the incident light flux to the scanning surface is parallel, the relationship $\delta_1 \approx \delta_2$ is established, and the following equation is established since the change of $\delta_1$ and $\delta_2$ in accordance with the view angle is negligible.

$$\delta = \delta_1 = \delta_2 \ldots \quad (7)$$

From this equation, $\theta_1$ and $\theta_2$ are given as follows:

$$\theta_1 = \delta \text{Ⓗ} /(E_1 - \delta) \quad (8)$$

$$\theta_2 = \delta \text{Ⓗ} /(E_2 - \delta) \quad (9)$$

Since it is apparent that the relation between $\delta$, $E_1$ and $E_2$ is $\delta < E_1 < E_2$, the following inequality is given:

$$\theta_1 > \theta_2 \ldots \quad (10)$$

Also, if $l_1 < l_2$ is established as described above, the following relationships are given:

$$|S_1(\theta)| > |S_2(\theta)| \quad (11)$$

$$\frac{\Delta S_1(\theta)}{\Delta \theta} > \frac{\Delta S_2(\theta)}{\Delta \theta} \quad (12)$$

From relationships (b 10) to (12), $$|\Delta S_1 \cdot \theta_1| > |\Delta S_2 \cdot \theta_2| \ldots \quad (13)$$

From the foregoing explanation, it is apparent that, the shorter the distance from the deflection point to the surface having the curvature changed in correspondence with the deflection direction, that is, the closer the surface to the deflection point, the larger the difference in the field curvature to be corrected between the adjacent light flux on that surface will become. Accordingly, for example, in the lens surface configuration at the position with which the adjacent light fluxes are contacted, the offset of the field curvature to be compensated for, from the ideal configuration, will become remarkable relative to both the light fluxes. It is therefore necessary to take the configuration to meet the conditions for the two adjacent light fluxes in an average manner. Thus, there is a tendency in which the imaging characteristics as a whole are degraded.

Figure 5:
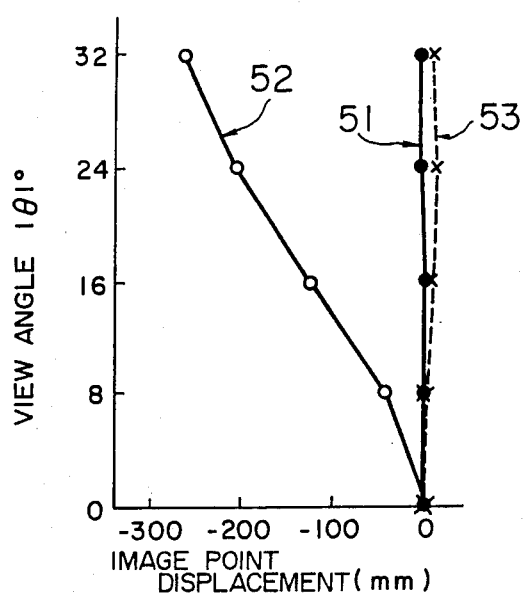
FIGS. 5, 6 and 7 are graphs showing the imaging characteristics according to the prior art and the present invention.
Figure 7:
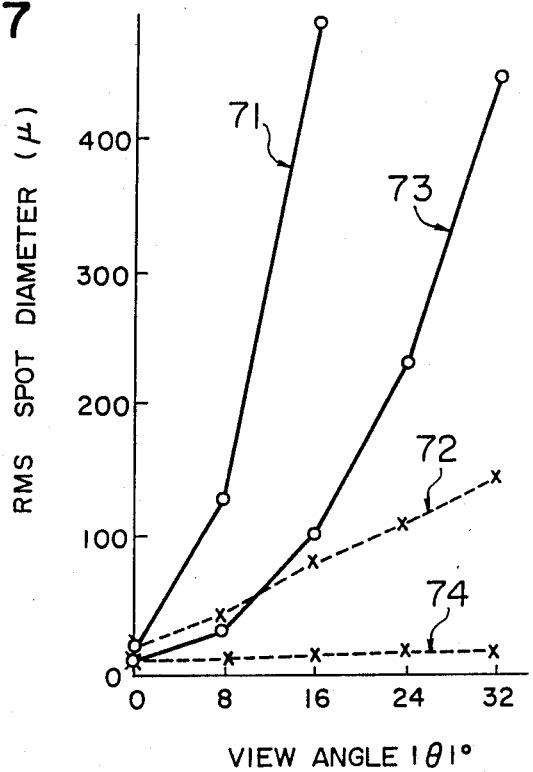

FIG. 5 shows the optimum imaging point positions 51 and 52 in the scanning direction and the surface tilt direction over the view angle range within 32 degrees in the case where a toric lens is used as a lens element closest to the rotary polygonal mirror In this case, FIG. 7 shows an RMS (root mean square) spot diameter indicated by a line 71. Also, in the case where the surface having the curvature changed in accordance with the deflection direction is used rather than the toric lens, the position of the optimum image point in the surface tilt direction is indicated by the dotted line 53 in FIG. 5 and the RMS spot diameter is indicated by the dotted line 72 in FIG. 7. From these graphs, the image point movement in the surface tilt direction. However, the RMS spot diameter reaches 145 microns at $\theta = 32$ degrees. Thus, it is understood that this is not suitable for the scanning lens that needs a high resolving power After all, in view of the problems in the manufacture of the press molding and the imaging characteristics, the necessary and minimum outer diameter of the lens element having the curvature changed in accordance with the deflection direction is unsuitable when it is too large or it is too small.

In order to cope with this problem, there is a method in which the distance from the rotary polygonal mirror from the lens element closest to the rotary polygonal mirror is elongated and the necessary and minimum outer diameter thereof is increased. However, since according to this method, the outer diameters of the other two lens elements are increased than necessary. Therefore, this method is not preferable.

Therefore, if the necessary imaging characteristics is obtained by changing the curvature of the central lens element in accordance with the deflection direction, this method is suitable. Also, in order to possibly decrease the outer diameter of the lens element, it is preferable to adapt an arrangement in which the central lens element is closer to the rotary polygonal mirror side lens element than the lens element on the scanning plane side relative to the scanning surface, $$1.0 > d_I/d_{II} > 0 \ldots \quad (3)$$

where $d_I$ is the distance between the principal points of the lens element located in the central position and the lens element closest to the rotary polygonal mirror, $d_{II}$ is the distance between the principal points of the lens element located farthest from the rotary polygonal mirror and the lens located in the central position.

The effect of the thus defined surface change will be explained in conjunction with FIG. 2.

Figure 2:
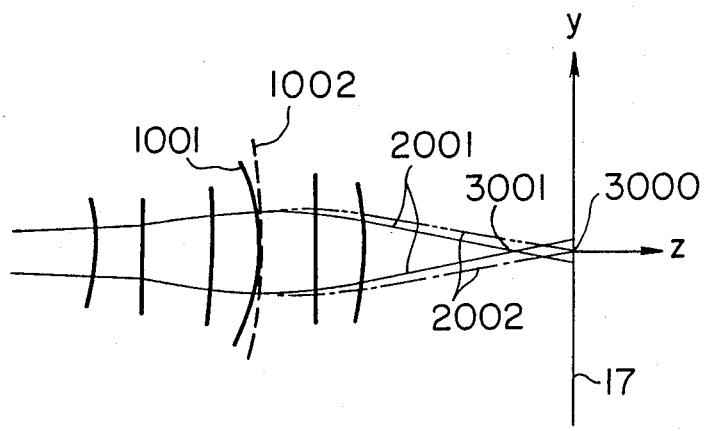
FIG. 2 is a view showing the effect of the invention.

In FIG. 2, z-axis represents the optical axis, and yz-plane represents a plane that affect the surface tilt at the view angle $\theta$. The solid line 1001 in FIG. 2 show the toric surface given by the following equation.

$$z = By^2 + M \ldots \quad (13)$$

where M is the distance between the principal point of the toric surface and the drum surface.

The light ray 2001 deflected by the surface 1001 is focused at a position 3001 before the point 3000. However, it is preferable that the ray of light be focused at the position 3000. Therefore, if the radius of curvature is changed as indicated by the dotted line 1002 so that the refractive power is decreased, it is possible to focus the light flux at the position 3000 as by the light flux 2002. Accordingly, it is possible to move the imaging point just on the drum surface by changing the radius of curvature to the spherical surface so that the refractive power at a position except for the axial position ($\theta \neq 0$) is made smaller than that at the optical axis ($\theta = 0$). In addition, it is sufficient to monotonously decrease the refractive power in accordance with the decrease of the view angle.

The present invention will now be described by way of example.

Figure 1:
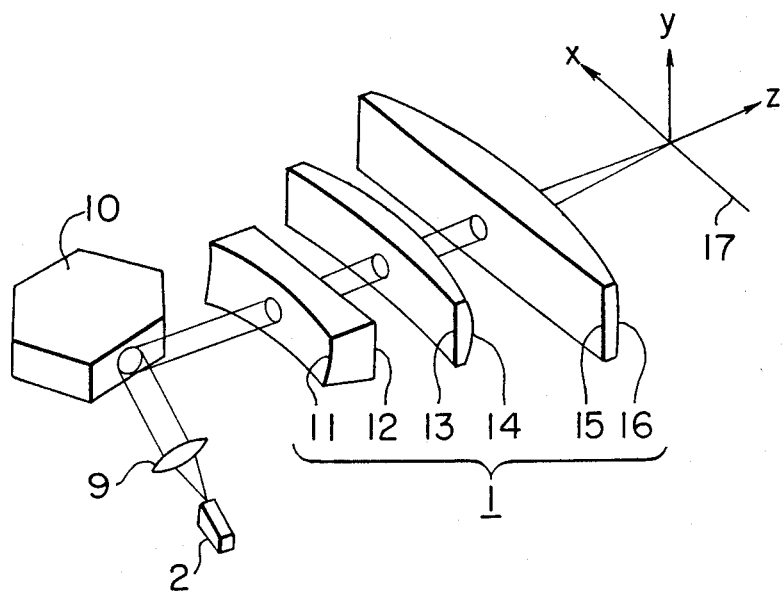
FIG. 1 is an illustration showing an embodiment of the invention.

FIG. 1 shows a basic arrangement according to the present invention, in which reference numeral 1 denotes an optical scanning lens, numeral 2 denotes a laser device, numeral 9 denotes a collimator lens, numeral 10 denotes a rotary polygonal mirror and numeral 17 denotes a drum surface.

Figure 8:
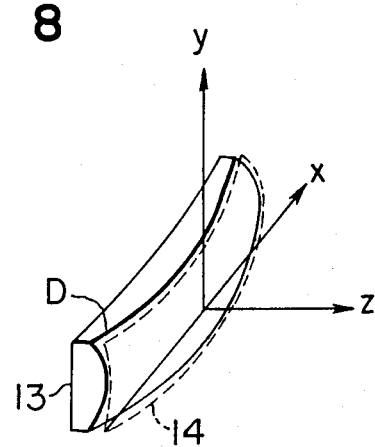
FIG. 8 is a view showing an aspherical surface (fourth surface) of the scanning lens according to the present invention.

The respective surfaces of three lens elements of the optical scanning lens 1 are represented by first through sixth surfaces in order from the polygonal mirror. According to the embodiment of the invention, the fourth surface 14 is configured so that, as the absolute value of the view angle is increased, the radius of curvature in the surface tilt direction is changed as shown in FIG. 8 so that its refractive power is monotonously decreased. First of all, the imaging characteristics will be inspected in the case where the fourth surface is composed by a toric surface that has been used in the optical scanning lens in the prior art.

The parameters of the lens are shown in Table 1, in which $r_1$ to $r_6$ are the radii of curvature of the surfaces of the respective lens elements counted from the deflection point in the scanning direction (x-axis direction), $r_1'$ to $r_6'$ are the radii of curvature of the surfaces of the respective lens elements counted from the deflection point in the surface tilt direction (y-axis direction), $d_1$ to $d_5$ is the lens thickness or the distance between the adjacent lens elements, and $n_1$, $n_3$ and $n_5$ are the refractive indices of the respective lens elements. fx and fy are the focal lengths in the scanning direction and the surface tilt direction, respectively, b.f is the backfocus, $S_1$ represents the position of the incident light source and sk' is the imaging position on the paraxial path from the final surface of the scanning lens to the scanning surface.

Figure 6:
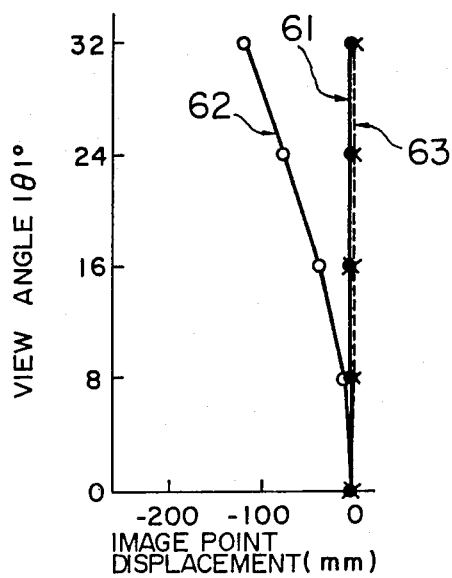

Reference numerals 61 and 62 in FIG. 6 represent the optimum image point positions in the scanning direction and the surface tilt directions, respectively, in a range within a view angle of 32 degrees. According to this graph, it will be understood that the imaging characteristics of the imag points 61 in the scanning direction is satisfactory but the image position curve 62 with respect to the surface tilt direction is remarkably curved toward the lens side as the focal length becomes short. This image point difference reaches 120 mm. Even if the intermediate position is taken at the drum surfaces, there is a remarkable change of ±60 mm in focal length, so that it is impossible to provide an optical scanning apparatus having a high resolving power. According to the present invention, the curvature of the image point curve is compensated for by changing the radius of curvature of the scanning lens in the surface tilt direction so that the refractive power of the scanning lens is changed in correspondence with the scanning direction. In other words, when the view angle is larger, the curvature of the fourth lens surface 14 in the surface tilt direction is changed in accordance with the curve of the image, so that the image surface is identical with the planer surface.

TABLE 1

| | | | | | | | |
|---|---|---|---|---|---|---|---|
| $r_1$ | −47.9 | $r_1'$ | −47.9 | $d_1$ | 3.0 | $n_1$ | 1.712 |
| $r_2$ | ∞ | $r_2'$ | ∞ | $d_2$ | 2.5 | | |

TABLE 1-continued

| | | | | | | | |
|---|---|---|---|---|---|---|---|
| $r_3$ | −275.7 | $r_3'$ | −275.7 | $d_3$ | 5.0 | $n_3$ | 1.719 |
| $r_4$ | −67.5 | $r_4'$ | −17.5 | $d_4$ | 12.5 | | |
| $r_5$ | ∞ | $r_5'$ | ∞ | $d_5$ | 10.0 | $n_5$ | 1.606 |
| $r_6$ | −78.8 | $r_6'$ | −78.8 | $d_6$ | | | |

| | | f | b.f | $S_1$ | Sk' |
|---|---|---|---|---|---|
| Scanning plane | fx | 275.5 | 336.8 | −∞ | 336.8 |
| Vertical cross-section (Surface tilt direction) | fy | 30.7 | 18.1 | −20.0 | 336.8 |

Figure 4:
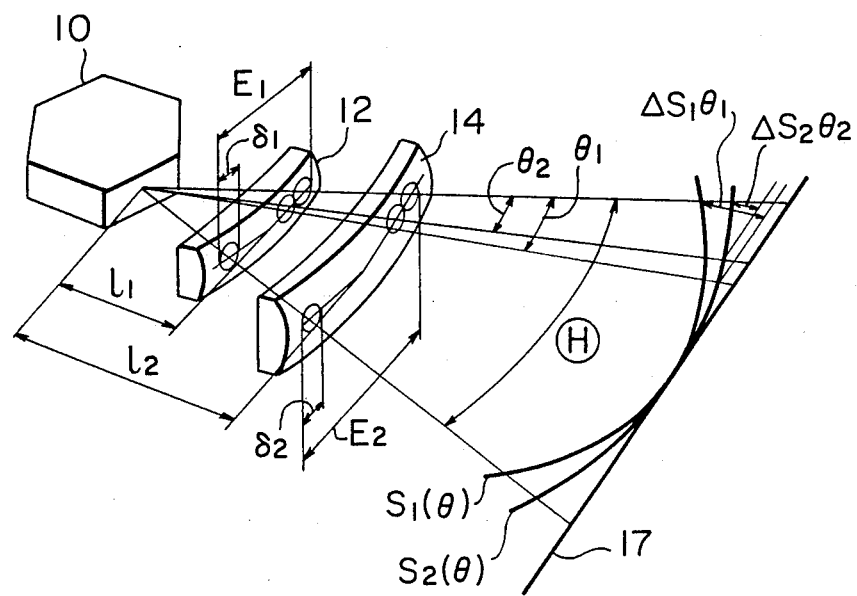
FIG. 4 is a view showing the difference in field curvature between the adjacent light fluxes.

FIG. 8 shows the state in which the curvature of the lens surface 14 shown in FIG. 4 with respect to the surface tilt direction is changed. The change of the surface configuration is represented by reference character D which means a magnitude of displacement by which the point (x, y) on the reference surface that is not modified in accordance with the surface tilt direction is moved in the z-direction as indicated by the dotted lines. The values of D with respect to the specific point (x, y) are shown in Table 2. The lens surface is formed so that the positions not indicated in this table are connected to each other in a smooth manner in accordance with a spline function. (The spline function is explained in detail in Information Processing "Algolism and Calculation Program of Insert Method" Vol. 17. No. 5, (1976) pp.417 to 425.) Since the imaging characteristics in the scanning direction are kept in a good condition, there is no surface change at $y \neq 0$. This result means that any value of D exceeds zero (D is positive in the case where the displacement is in the + direction of z-axis), the absolute value of D is monotonously increased as the absolute value of x is increased relative to the absolute value of y, and the refractive power is monotonously decreased. Namely, the image point position at $x = \theta$ is extended as remotely as possible, as required, so that the focal length is changed. The values of x in the table represent the x-coordinate of the principal light ray when the flux of light passes through the fourth surface at the view angle $\theta$.

The imaging characteristics of the scanning lens thus obtained are shown by the dotted lines 63 in FIG. 6. Since the imaging characteristics of the line 62 are similar to those of the dotted lines 63, and the imaging characteristics in the scanning direction are kept unchanged, the overall imaging characteristics within the view angle of 32 degrees are considerably improved. Furthermore, the RMS spot diameters of the light flux in the imaging surface are shown in FIG. 7. The curve 73 shows the prior art, and the dotted curve 74 shows the present invention. Also from this, it is apparent that the imaging characteristics according to the present invention are considerably improved.

Incidentally, in the case where the imaging characteristics in the scanning direction are degraded when the view angle is increased, it is possible to eliminate the deterioration by moving the surface also at $y = 0$.

TABLE 2

| x = −16.505 mm ($\theta$ = −32°) | | | |
|---|---|---|---|
| y | D | y | D |
| −2.0 | 4.6 | −1.0 | 1.15 |
| 0.0 | 0.0 | 1.0 | 1.15 |
| 2.0 | 4.6 | | |

| x = −12.3495 mm ($\theta$ = −24°) | | | |
|---|---|---|---|

TABLE 2-continued

| y | D | y | D |
|---|---|---|---|
| −2.0 | 2.46 | −1.0 | 0.615 |
| 0.0 | 0.0 | 1.0 | 0.615 |
| 2.0 | 2.46 | | |

$x = -8.2309$ mm ($\theta = -16°$)

| y | D | y | D |
|---|---|---|---|
| −2.0 | 1.08 | −1.0 | 0.27 |
| 0.0 | 0.0 | 1.0 | 0.27 |
| 2.0 | 1.08 | | |

$x = -4.1162$ mm ($\theta = -8°$)

| y | D | y | D |
|---|---|---|---|
| −2.0 | 0.24 | −1.0 | 0.06 |
| 0.0 | 0.0 | 1.0 | 0.06 |
| 2.0 | 0.24 | | |

$x = 0.0$ mm ($\theta = 0°$)

| y | D | y | D |
|---|---|---|---|
| −2.0 | 0.0 | −1.0 | 0.0 |
| 0.0 | 0.0 | 1.0 | 0.0 |
| 2.0 | 0.0 | | |

$x = 4.1162$ mm ($\theta = 8°$)

| y | D | y | D |
|---|---|---|---|
| −2.0 | 0.24 | −1.0 | 0.06 |
| 0.0 | 0.0 | 1.0 | 0.06 |
| 2.0 | 0.24 | | |

$x = 8.2309$ mm ($\theta = 16°$)

| y | D | y | D |
|---|---|---|---|
| −2.0 | 1.08 | −1.0 | 0.27 |
| 0.0 | 0.0 | 1.0 | 0.27 |
| 2.0 | 1.08 | | |

$x = 12.3495$ mm ($\theta = 24°$)

| y | D | y | D |
|---|---|---|---|
| −2.0 | 2.46 | −1.0 | 0.615 |
| 0.0 | 0.0 | 1.0 | 0.615 |
| 2.0 | 2.46 | | |

$x = 16.505$ mm ($\theta = 32°$)

| y | D | y | D |
|---|---|---|---|
| −2.0 | 4.6 | −1.0 | 1.15 |
| 0.0 | 0.0 | 1.0 | 1.15 |
| 2.0 | 4.6 | | |

D: Surface change μ (z-direction)
y: mm

What is claimed is:

1. An optical scanning apparatus having a rotary polygonal mirror for scanning and deflecting a flux of light from a light source, and a scanning lens having a function to compensate for and to decrease a nonuniformity in scanning spaces due to a surface tilt of said rotary polygonal mirror, said scanning lens focusing the flux of light at a position on a scanning plane in proportion to a deflection angle of the deflected light flux, comprising the improvement wherein said scanning lens is composed of three lens elements, and a refractive power, in a direction effecting the correction of the surface tilt, that is, an inverted number of a focal length, of a lens element located centrally in said scanning lens is changed in accordance with a scanning view angle.

2. The apparatus according to claim 1, wherein a radius of curvature, in the direction effecting the correction of the surface tilt, of the central lens element located centrally in the scanning lens is changed so that the refractive power is monotonously decreased as an absolute value of the scanning view angle is increased.

3. The apparatus according to claim 2, further satisfying the following condition:

$$1.0 > d_I/d_{II} > 0$$

where $d_I$ is the distance between the principal points of the lens elements located closest to the rotary polygonal lens and located centrally in the scanning lens, and $d_{II}$ is the distance between the principal points of the lens elements located farthest from the rotary polygonal mirror and located centrally in the scanning lens.

4. The apparatus according to claim 1, wherein the central lens element located centrally in the scanning lens has a non-spherical surface with the radius of curvature changing along the surface thereof.

* * * * *